3,347,819
POLYOLEFINES STABILIZED BY DIBORANES
Gerhard Meyer, Obernburg, Erhard Siggel, Seckmauern uber Hochst im Odenwald, Albert Schöpf, Hering uber Hochst im Odenwald, and Helmut Mägerlein, Erlenbach, Germany, assignors to Vereinigte Glanzstoff-Fabriken AG., Wuppertal, Elberfeld, Germany
No Drawing. Filed Jan. 26, 1965, Ser. No. 428,240
Claims priority, application Germany, Jan. 31, 1964,
V 25,293
14 Claims. (Cl. 260—45.7)

ABSTRACT OF THE DISCLOSURE

Stabilizing a high molecular weight poly-α-monoolefine such as polypropylene against oxidation by heating it in finely divided dispersed form in an inert organic liquid such as heptane containing a small amount, e.g. 0.01 to 1% by weight with reference to the poly-α-monoolefine, of a boron compound of the formula $(R_1R_2BH)_2$ wherein $R_1$ and $R_2$ each represent hydrogen or alkyl, cycloalkyl, aryl and aralkyl of 1 to 18 carbon atoms. Examples of such boron compounds are diborane, dilauryldiborane, tetraphenyldiborane and the like. The resulting stabilized poly-α-monoolefine is useful in producing filaments, films and molded articles resistant to oxidation.

---

This invention is concerned with a process for treatment of high molecular weight polyolefines so as to improve their stability against oxidation. More particularly, the invention relates to a method of contacting a polyolefine with a specific treating agent under conditions which are sufficient to enhance the oxidation-resistance of the resulting polyolefine product.

It is known that valuable products in the form of filaments, films, foils or other extruded or molded articles can be produced from polyolefines obtained by the addition polymerization of monomeric olefines, such as the alpha-monoolefines of from 2 up to about 10 carbon atoms. Especially favorable properties are exhibited by solid high molecular weight polyolefines which have been obtained by the so-called low pressure polymerization process requiring the use of a stereospecific catalyst or the so-called Ziegler catalysts. Although such polyolefines have advantageous properties such as high strength, high density, relatively higher melting points and general resistance to chemical attack, they exhibit a somewhat limited stability against attack by oxygen, especially where there is simultaneous application of heat and/or exposure to ultraviolet rays. The damage shown by polyolefines under such oxidation conditions has been attributed to the presence of double bonds in or on the molecular chain of the polymer, these double bonds or olefinically unsaturated portions of the molecule being particularly susceptible to attack by oxygen. It does not appear to be possible to prevent or avoid the occurrence of these double bonds by any special precautions during polymerization. Therefore, in order to improve the stability of the polyolefine, it is apparently necessary to subject the polymer to an after-treatment which will tend to saturate the double bonds.

For example, it has been suggested that the polymer be subjected to a treatment with certain silicon compounds in which at least one hydrogen atom is attached directly to the silicon atom. In this known process, the polyolefine must be dissolved in a solvent and stirred for a relatively long period of time together with the silicon compound and a suitable catalyst. Aside from the fact that this process requires the use of considerable amounts of solvents and precipitation agents, it is unusually expensive because a thorough purification must be carried out after the treatment with the silicon compound and precipitation of the treated polymer from its solution.

According to an alternative of this known process, the stabilizing treatment can also be carried out by mixing the polyolefine with the silicon compound in an extruder at elevated temperatures, e.g. 250–300° C. However, a uniform stabilization is not obtained in this manner. Furthermore, this process suffers from the disadvantage that the silicon compound remains in the polymer.

In another known process, hydrogenation of the double bonds has been attempted in order to solve the problem of stabilization. The polyolefine in the form of a solution, emulsion or suspension is conducted through a suitable hydrogenation reaction vessel where it is brought into contact with a specific hydrogenation catalyst. This process requires a considerable expenditure in apparatus and time and is not suitable for treating large amounts of polyolefines. Finally, this method is disadvantageous in that the treated polyolefine must be subjected to additional steps for removal of the heterogeneous hydrogenation catalyst which would otherwise cause trouble in the normal processing of the polyolefine into finished articles.

The primary object of the present invention is to provide a process of treating a polyolefine which will lead to an improved product exhibiting better resistance to oxidation and aging, especially such oxidation as may occur in normal use of the polymer where it is exposed to heat and light.

Another object of the invention is to improve the stability of polyolefines against oxidation by a process or method which can be carried out in an economical manner and under easily controlled conditions.

Yet another object of the invention is to provide a process for improving the stability of polyolefines whereby conventional apparatus can be employed and the necessary steps can be readily combined with conventional polymerization processes for the production and separation of a substantially pure polyolefine.

Still another object is to improve the polyolefine stability by a process which permits the treatment of large quantities of the polymer on a commercial scale.

These and other objects and advantages of the invention will become more apparent after considering the following detailed specification.

It has now been found, in accordance with the present invention, that an improved polyolefine product can be obtained by dispersing the polyolefine in an inert organic liquid selected from the group consisting of hydrocarbons and chlorinated hydrocarbons containing a small amount of a boron compound having the formula $$(R_1R_2BH)_2$$

wherein $R_1$ and $R_2$ are substituents representing hydrogen or alkyl, cycloalkyl, aryl or aralkyl of from 1 to 18 carbon atoms, and heating this dispersion with mixing or agitation at a temperature from about room temperature up to the boiling point of the inert dispersing liquid, e.g. from about 50° C. to 150° C. and preferably about 60°–120° C., for a period of time sufficient to enhance the oxidation stability of the polyolefine. The polyolefine is then separated from the dispersion, for example by filtration, and is then preferably washed two or more times with the inert organic liquid and finally dried by evaporation or distilling off any adherent organic liquid.

The process of the present invention is particularly advantageous for the treatment of poly-alpha-monoolefines of from 2 up to about 8 carbon atoms in the monomeric alpha-monoolefine, and especially good results have been achieved with the treatment of the polyolefines of the 3 to 6 carbon atom monomers, e.g. polypropylene, polybutylene or poly-4-methylpentene-1. The results are also quite significant where the treatment is applied to stereoregulated or isotactic polyolefines as obtained by polymerization of the olefine under low pressure conditions in the presence of particular catalyst systems commonly referred to as stereospecific catalysts. These catalyst systems are well known in this art as well as the polymerization conditions and methods of recovering the isotactic polymer product, the preferred Ziegler catalyst contains $TiCl_3$ in combination with a trialkyl aluminum, e.g. triethyl aluminum.

The process of the invention is most conveniently carried out after the polyolefine has been purified, i.e. after polymerization has taken place and the polymer has been purified by removing and recovering the catalyst components therefrom. In the case of Ziegler type catalysts which are acid-soluble, the polymerization product is extracted with alcoholic-HCl, e.g. weak HCl in methanol, and the polymer is then washed and/or neutralized for substantially complete removal of the extractant and catalyst components. At this point, the purified polyolefine is in the form of a finely divided powder which can be readily subjected to the stabilizing treatment of the invention. Furthermore, the preceding steps are carried out in conventional apparatus with the substantial exclusion of oxygen and water, and the purified polyolefine can then be treated in the same apparatus under the same conditions of an oxygen-free and moisture-free environment, thereby, avoiding any procedural complications in the overall process.

The purified polyolefine powder is normally obtained in conventional polymerization processes in a particle size which is quite suitable for the stabilizing treatment of the invention within a reasonable period of time. Smaller particles can usually be treated at lower temperatures and/or shorter periods of time. In general, it is desirable to use particle sizes of about $0.1\mu$ to $500\mu$.

The boron compound employed as the treating agent can be added to the inert organic dispersing liquid in quite small amounts of at least 0.001% and preferably about 0.01 to 1% by weight, with reference to the total amount of the polyolefine. Somewhat higher amounts of the boron compound, e.g. up to 2% or even 5% by weight (with reference to the polyolefine), can also be employed but without any special advantage.

Suitable boron compounds in addition to diborane include those derivatives in which each boron atom is substituted once or twice by a hydrocarbon radical, e.g. alkyl of 1 to 18 carbon atoms and preferably 1 to 12 carbon atoms, cycloalkyl of preferably 5 to 8 carbon atoms, aryl such as phenyl or naphthyl or their lower alkyl-substituted derivatives, or aralkyl such as benzyl. See, for example, the discussion of such boron compounds in "The Chemistry of Organometallic Compounds" by Eugene G. Rochow et al. (John Wiley & Sons, Inc., New York, 1957), pages 124–131. Specific boron compounds are as follows:

| Chemical name: | Formula |
| --- | --- |
| Diborane | $B_2H_6$ |
| Dimethyldiborane | $(CH_3)_2B_2H_4$ |
| Dilauryldiborane | $(C_{12}H_{25})_2B_2H_4$ |
| Tetralauryldiborane | $((C_{12}H_{25})_4B_2H_2$ |
| Tetrabutyldiborane | $(C_4H_9)_4B_2H_2$ |
| Tetraphenyldiborane | $(C_6H_5)_4B_2H_2$ |
| Dicyclohexyldiborane | $(C_6H_{11})_2B_2H_4$ |
| Tetracyclohexyldiborane | $(C_6H_{11})_4B_2H_2$ |
| Dibutyldiborane | $(C_4H_9)_2B_2H_4$ |
| Tetracyclohexyldiborane | $(C_6H_{11})_4B_2H_2$ |
| Dibenzyldiborane | $(C_7H_7)_2B_2H_4$ |
| Tetrabenzyldiborane | $(C_7H_7)_4B_2H_2$ |
| Ditolyldiborane | $(C_7H_7)_2B_2H_4$ |
| Tetratolyldiborane | $(C_7H_7)_4B_2H_2$ |
| Diphenyldiborane | $(C_6H_5)_2B_2H_4$ |

Dispersing agents which can be used as an inert liquid medium for the stabilizing treatment include the following: hydrocarbons such as pentane, hexane, heptane, benzine, benzene, toluene, xylene, dekalin, tetralin or diesel oil, and also chlorinated hydrocarbons such as methyl chloride, methylene chloride, chloroform, ethyl chloride, ethylene chloride, tetrachlorinated hydrocarbons such as tetrachlorethane, chlorobenzene or the like. Of course, it is also possible to use mixtures of these inert liquids or to use a different liquid for washing than is used during the treatment itself, but it is generally more convenient to use just one liquid for all of the process steps.

It is preferable to employ a compound as the dispersing agent which is easily volatilized because it is then much easier to separate and recover the inert liquid after the stabilization treatment is completed. For example, hydrocarbons and their chlorinated derivatives with boiling points below about 100° C. are especially useful.

The temperatures and periods of time for any specific treatment obviously depend on a number of different factors. At higher temperatures, the treatment can be completed more quickly. In order to shorten the treatment period, it is also possible to work under elevated pressure in a closed vessel at temperatures which extend up to the boiling point of the dispersing agent at the pressure being considered. Thus, by working under pressure, low-boiling organic liquids can be used at much higher temperatures to obtain correspondingly shorter periods of treatment. In general, the process of the invention is best carried out with treatment periods of about 30 minutes to 5 hours.

By comparison with known stabilizing methods, the process of the present invention offers the advantage that it can be carried out directly in conjunction with the purification of the polymer without interfering with the normal polymerization or the separation and recovery of the polymerization catalyst and purified polymer. The excess treating agent can be separated by filtration or centrifuging, and the polymer is easily purified to remove substantially all of this treating agent by a simple washing with the inert organic liquid. Thus, it is possible to avoid a special purification as is required in known methods which use a heterogeneous catalyst for the stabilizing treatment. A much more uniform and extensive stabilization is obtained by contacting the polyolefine powder with the dissolved treating agent according to the invention than is possible by incorporating or engraining a stabilizing agent into the polymer.

The process of the invention is further illustrated but not limited by the following examples.

*Examples 1–6*

In a 1-liter two-necked flask equipped with an agitator and reflux condenser, 100 grams of polypropylene were dispersed in 600 ml. of heptane. The polypropylene was that produced by polymerization of propylene in the presence of aluminum triethyl and $TiCl_3$ as a stereospecific catalyst. After completion of the polymerization, the polypropylene was purified with hexane and with methanol in admixture with hydrochloric acid, washed neutral and then dried. To this dispersion there was added a solution of 0.3 gram diborane in 50 ml. heptane, produced from 0.62 gram $NaBH_4$ and 0.77 gram $BF_3.O(C_2H_5)_2$. The dispersion was then heated with agitation for four hours at 98° C. The dispersing agent was filtered off, the powder washed twice with 100 ml. heptane each time and thereafter dried under nitrogen. Finally the stability of the treated polymer was measured as described below.

The method of the invention can be carried out in the same manner with other boron compounds and also with the use of other dispersing agents. The results of six of these tests, including one control sample, are shown in the following table:

TABLE

| Ex. | Boron compound | Percent by weight * | Dispersing agent | Treatment Time, hrs. | Temp., °C. | Stability, minutes |
|---|---|---|---|---|---|---|
| 1 | Diborane | 0.03 | Heptane | 4 | 98 | 103 |
| 2 | Dilauryl-diborane | 0.5 | ----do---- | 4.5 | 98 | 98 |
| 3 | Tetralauryl-diborane | 0.5 | ----do---- | 4 | 98 | 89 |
| 4 | Tetraphenyl-diborane | 0.6 | ----do---- | 5 | 98 | 114 |
| 5 | Diborane | 0.05 | Chloroform | 4 | 61 | 106 |
| 6 | | | Heptane | 4 | 98 | 58 |

* With reference to the amount of polypropylene.

Example 7

Under substantially the same conditions as described in Examples 1–6, 100 grams of a purified poly-4-methylpentene-1 in the form of a powder were dispersed in 600 ml. hexane. To this mixture were added 0.3 gram diborane in 50 ml. hexane. The dispersion was heated with agitation for five hours at 60° C. The dispersing agent was then filtered off and the powder washed twice with 100 ml. hexane each time, dried under nitrogen and finally measured for stability. The stability measurement showed a value of 14 minutes. When the experiment is repeated in the same manner but without the addition of the diborane treating agent, then a stabilizing value of only six minutes was obtained.

For determination of the stability of the treated polypropylene in the above examples, 30 grams of the polymer powder were ground in a ball mill with a stabilizing mixture of 0.03 gram dilaurylthiodipropionate and 0.03 gram 4,4'-thio-bis-(3-methyl-6-t-butylphenol), i.e. in each case 0.1% by weight with reference to the polypropylene, for a period of 30 minutes. 12 grams of this mixture were then pressed in a plate press at 170° C. under 350 atm. into a 1 mm. thick plate. The plate was cut into strips 3–4 mm. wide and 30–40 mm. long from which 3 grams were introduced into a test tube standing in an aluminum block at 200±1.5° C. and connected to an oxygen burette. By controlling the volume of oxygen, the time in minutes is determined for spontaneous oxygen absorption to begin. This induction period for the oxidation of the polymer at 200° C. in pure oxygen serves as a measure of the stability at room temperature. In the case of poly-4-methylpentene-(1), the measurement was carried out at 230° C. and the oxygen was introduced into the stabilized unpressed powder.

Similar results can be achieved under conditions corresponding to the preceding examples by treating the polyolefine with boron compounds as dimethyldiborane, tetramethyldiborane, dibutyldiborane, tetrabutyldiborane, dicyclohexyldiborane, tetracyclohexyldiborane, dibenzyldiborane, tetrabenzyldiborane, ditolyldiborane, tetratolyldiborane, diphenyldiborane or dispersing agents such as benzene, toluene, xylene, tetralin, dekalin, cyclohexane, octane, isooctane and other aliphatic hydrocarbons with 9 to 18 C-atoms and also carbon tetrachloride, ethane dichloride, ethantetrachloride, ethylentrichloride, chlorobenzene or the like.

The invention is hereby claimed as follows:

1. A process for improving the stability of a high molecular weight poly-α-monoolefine of a 2 to 8 carbon atom monomeric α-monoolefine which comprises: dispersing said poly-α-monoolefine as a finely divided powder in an inert organic liquid selected from the group consisting of hydrocarbons and chlorinated hydrocarbons containing a small amount of a boron compound of the formula $(R_1R_2BH)_2$ wherein $R_1$ and $R_2$ each represents a substituent selected from the group consisting of hydrogen and alkyl, cycloalkyl, aryl and aralkyl of 1 to 18 carbon atoms; heating said dispersion with agitation at a temperature from about room temperature up to the boiling point of said inert dispersing liquid; and separating the poly-α-monoolefine from said dispersion.

2. A process as claimed in claim 1 wherein said boron compound is present in an amount of about 0.01 to 1% by weight, with reference to the poly-α-monoolefine.

3. A process as claimed in claim 1 wherein said dispersion is heated for a period of about 30 minutes up to about 5 hours.

4. A process as claimed in claim 1 wherein said dispersion is heated at a temperature of about 50° C. to 150° C.

5. A process as claimed in claim 1 wherein said dispersion is heated at a temperature of about 60° C. to 120° C.

6. A process as claimed in claim 1 wherein said boron compound is diborane.

7. A process as claimed in claim 1 wherein said boron compound is dilauryldiborane.

8. A process as claimed in claim 1 wherein said boron compound is tetralauryldiborane.

9. A process as claimed in claim 1 wherein said boron compound is tetraphenyldiborane.

10. A process as claimed in claim 1 wherein said dispersion is heated for about 30 minutes to 5 hours in the presence of about 0.01 to 1% by weight of said boron compound, with reference to the poly-α-monoolefine, at a temperature of about 50° C. to 150° C., and the polyolefine is separated from the dispersion and washed with said inert dispersing liquid.

11. A process as claimed in claim 10 wherein said poly-α-monoolefine is polypropylene.

12. A process as claimed in claim 10 wherein said poly-α-monoolefine is poly-4-methylpentene-1.

13. The stabilized poly-α-monoolefine product obtained by the process of claim 1.

14. The stabilized poly-α-monoolefine product obtained by the process of claim 10.

References Cited
FOREIGN PATENTS
636,120   3/1962   Italy.

DONALD E. CZAJA, *Primary Examiner.*

LEON J. BERCOVITZ, *Examiner.*

M. J. WELSH, *Assistant Examiner.*

UNITED STATES PATENT OFFICE
CERTIFICATE OF CORRECTION

Patent No. 3,347,819                        October 17, 1967

Gerhard Meyer et al.

It is hereby certified that error appears in the above numbered patent requiring correction and that the said Letters Patent should read as corrected below.

Column 3, line 70, for "Tetracyclohexyldiborane -------- $(C_6H_{11})_4B_2H_2$" read -- Tetramethyldiborane -------- $(CH_3)_4B_2H_2$ --.

Signed and sealed this 4th day of February 1969.

(SEAL)
Attest:

Edward M. Fletcher, Jr.
Attesting Officer

EDWARD J. BRENNER
Commissioner of Patents